US006870537B2

(12) United States Patent
Kikuchi et al.

(10) Patent No.: US 6,870,537 B2
(45) Date of Patent: Mar. 22, 2005

(54) IMAGE PROCESSING DEVICE, GROUP CHARACTER MOVEMENT CONTROL METHOD, GAME DEVICE INCLUDING GROUP CHARACTER MOVEMENT CONTROL, GAME SCORE COMPUTING METHOD AND RECORDING MEDIUM

(75) Inventors: Masayoshi Kikuchi, Tokyo (JP); Outa Sano, Tokyo (JP); Toru Osaki, Tokyo (JP); Kazuhisa Hasuoka, Tokyo (JP); Ryuta Ueda, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 171 days.

(21) Appl. No.: 09/820,975

(22) Filed: Mar. 30, 2001

(65) Prior Publication Data

US 2001/0026265 A1 Oct. 4, 2001

(30) Foreign Application Priority Data

Mar. 30, 2000 (JP) .......................................... 2000-95920

(51) Int. Cl.$^7$ .............................................. G06T 15/70
(52) U.S. Cl. ............................ 345/474; 463/30; 463/31
(58) Field of Search ............................ 345/474; 463/30, 463/31

(56) References Cited

PUBLICATIONS

Microsoft, Age of Empires Help File, Oct. 3, 1997, pp. 1–11.*
Dave C. Pottinger, Coordinated Unit Movement, Jan. 22, 1999, Game Developer Magazine, pp. 1–25, http://www.gamasutra.com/features/19990122/movement_01.htm.*
Dave C. Pottinger, Implementing Coordinated Movement, Jan. 29, 1999, Game Developer Magazine, pp. 1–17, http://www.gamasutra.com/features/19990129/implementing_01.htm.*
F. Markus Jonsson, An Optimal Pathfinder for Vehicles in Real–World Digital Terrain Maps, 1997, pp. 1–42.*
W. Bryan Stout, Smart Moves: Intelligent Path–Finding, Feb. 12, 1999, Game Developer Magazine.*
Microsoft, Age of Empires, 1997, pp. 1–18.*

* cited by examiner

Primary Examiner—Kimbinh T. Nguyen
(74) Attorney, Agent, or Firm—Finnegan, Henderson, Farabow, Garrett & Dunner, L.L.P.

(57) ABSTRACT

A game device including group character movement control is capable of carrying out the processing steps without increasing the processing load and without giving any sense of strangeness, such as dull movement, even when the number of characters to be moved and controlled in the virtual space increases. By grouping the sub characters and causing all of such grouped sub characters to move based on the same control point, the processing load is lightened in comparison to individually chasing the main character, it is possible to display more sub characters, and prevents defects such as slow game progress and partially deficient screen display. In addition, as it is possible to produce a sense of tension to the main character (player) of being chased by a group, the game amusement is enhanced thereby.

12 Claims, 8 Drawing Sheets

IMAGE PROCESSING DEVICE, GROUP CHARACTER MOVEMENT CONTROL METHOD, GAME DEVICE INCLUDING GROUP CHARACTER MOVEMENT CONTROL, GAME SCORE COMPUTING METHOD AND RECORDING MEDIUM

BACKGROUND OF THE INVENTION

1. Field of the Invention

The present invention is directed to an image processing device for controlling the display image so as to move a plurality of characters in a virtual space; a group character movement control method for successively setting an optimum passage distance and controlling the movement of a sub character for chasing and capturing a main character; and a game device for controlling the game score by judging whether the player's operation in accordance with unrelated instructions while escaping was actually in accordance with such instructions.

2. Description of the Related Art

Conventionally, a wide variety of game applications are applicable to the game device (Dreamcast) provided by the applicant. As one game application thereof, there is a game (House of the Dead) wherein a plurality of characters sequentially attack the main character operable by the player.

In this game, the image processing device of the game device body controls the movement of each of the plurality of chasing characters while maintaining the overall cooperativeness. Thus, the player recognizes that the movement of the characters is massed in totality.

Nevertheless, upon individually controlling the movement of each of the characters, the processing load of the image processing device would increase when the number of characters increases, and it is inevitable to decrease the number of bits provided to one character and dull the movement of such character. Moreover, if the number of characters is restricted, there is a possibility that the game itself would become monotonous and uninteresting.

Further, in general game applications, there are those that link games unrelated to the game story of such game application in order to prevent the monotonousness of the game. However, this scheme is merely a combination of two games, and it is difficult to achieve advantages exceeding the effect of merely a combination of games.

SUMMARY OF THE INVENTION

Thus, an object of the present invention is to obtain an image processing device and game device capable of carrying out the processing steps without increasing the processing load and without giving any sense of strangeness, such as dull movement, even when the number of characters to be moved and controlled in the virtual space increases.

Another object of the present invention is to obtain an computing method capable of constructively deviating from the one game story and scoring in a different form.

Thus, in order to achieve the aforementioned objects, the present invention is an image processing device for controlling the display image so as to move a plurality of characters in a virtual space; wherein the plurality of characters are grouped in prescribed numbers; and a control point is provided for moving the plurality of characters in the groups in the same direction for each group, and controlling the movement of the characters based on the control point for each group.

In the present invention, the display image contains planar images of the road on which the character may freely move, and this plan view image may be overlapped and displayed on either the main image or at the corner of the main image as radar image.

According to the present invention, a plurality of group characters are grouped, and such grouped characters move based on one control point. Thus, the display control of characters in the same group is simplified, and it is possible to continue smooth operation without increasing the processing load.

Further, in the present invention, the display image is a plan view image, and this plan view image may be the main image, or by making the main image a three-dimensional display for example and displaying such plane view image as a radar image at the corner of this main image, it is possible to confirm the position of the character.

The present invention is also an image processing device for controlling the display image such that the main character which moves pursuant to input operations and a sub character in which the movement direction thereof is determined based on the movement of the main character are displayed in a virtual space, and a plurality of sub characters chase after the main character, the image processing device comprising: grouping means for grouping the plurality of sub characters in prescribed numbers; control point generation means for providing within the virtual space a control point for moving the plurality of sub characters within the groups in the same direction for each group; setting means for setting an optimum distance for approaching the main character based on the position of the main character; and movement control means for moving the sub character group by tracing the control point based on the distance set with the setting means.

According to the present invention, a main character movable by input operations and a sub character are separated by utilizing the movement control of a plurality of characters with the aforementioned control point, and the sub characters are grouped.

Thereby, a group of sub characters will chase after the main character, and it is possible to increase the sub characters without hindering the game amusement.

In the aforementioned inventions, when two or more groups enter an area in a prescribed range, the image processing device further comprises connection means for connecting the groups at connection points, and controls the processing such that the trailing group chases the leading group and connects thereto, and, after the connection, chases the main character based on the control point of the leading group.

In other words, when two or more groups approach each other, the control processing load may be further lightened by taking such groups as a single group.

The present invention is also a game device including group character movement control, comprising: display control means for displaying a main character and a plurality of sub characters in a prescribed area displayed in a virtual space; input operation means for making the main character freely movable; and passage distance setting means for priorly setting a passage distance at a prescribed position in the virtual space; wherein the game device successively sets an optimum passage distance and controls the movement of the sub characters for chasing and capturing a main character; and wherein the plurality of sub characters are grouped in prescribed intervals, and the plurality of sub characters in the groups are moved based on the control point by setting a control point for each group and the passage distance setting means setting a passage distance of the control point.

According to the present invention, the main character escapes the sub characters pursuant to the operation of the input operation means. Meanwhile, the sub characters move in group units based on the control point set along the set distance. As the control point traces the optimum distance for chasing the main character, if the main character does not move, the sub character will approach it together with the lapse in time.

Therefore, the main character may continue escaping by conducting input operations while determining where the sub characters are passing. Here, the grouped sub characters will increase the pressure and tension to the main character, and the process of grouping which aims at the lightening of the processing load will also increase the game amusement.

In the present invention, wherein when two or more groups enter an area in a prescribed range, the game device controls the processing such that the trailing group chases the leading group and connects thereto, and, after the connection, the trailing group moves based on the control point of the leading group.

Further, when the sub characters approach the main character within a prescribed distance, the sub characters are capable of attacking the main character.

Moreover, the attack is controlled such that the sub characters jump on and capture the main character, and the main character is capable of being operated to escape such capture from the start to the end of the capture operation of the sub characters.

In addition, the attackable area is separated into blocks, and, for each block as well as for adjacent block boundaries, a pass point is provided to become the base for setting the movement target of the sub characters.

Furthermore, the control point moves along the line connecting the pass points. This line between the points is not restricted to a straight line, and may be a smooth curved line or a broken line which interpolates the pass points.

Moreover, with respect to the plurality of groups connected at the connection points, the connection at the connection point may be unconnected when the sub characters start attacking the main character.

Here, the timing may be when the one or more sub characters belonging to one or more groups finish attacking the main character or when all sub characters of one group start attacking the main character.

The present invention is also a computing method, which is to be employed in the aforementioned game device, for computing the score of the second game linked to the first game where the main character is chased by the sub characters and executed while the main character is escaping; wherein the game mode of the second game is set as a plurality of stages and the scores of the respective stages are added when the game mode is ended.

According to the present invention, as an entirely different second game is incorporated in the first game, depth is provided to the game. In, other words, the game will be monotonous if the main character is merely chased by the sub characters. Thus, by scoring points, for example, by reflecting the points scored in the first game, while executing the second game when there is some leeway during the escape, the game amusement is improved.

Further, when the game is successful, game end is permitted, and when there is an intention of ending the gaze, points up to the successful stage are added.

Moreover, with respect to the respective stages, when the game is ended pursuant to the intention or the player, points acquired up to the current stage are added, but the game is continued; that is, when the player fails during the following stage and is not able to clear the stage, the score of this stage of the current game mode in a successful case is cancelled.

In other words, the main character has no leeway in playing the second game slowly considering that it is being chased by sub characters. Nevertheless, as points are added for each stage cleared, more stages cleared, the higher the score. Thus, the game end is permitted by clearing the respective stages, and, when there is an intention of ending the second game, the points up to such time are added.

Meanwhile, when moving on to the next stage in order to increase one's score but the stage could not be cleared as the sub character caught up with the main character and the escape must be restarted once again, the points for having cleared the previous stages will all be cancelled as a result thereof.

Furthermore, the second game is a game of writing graffiti on walls while the main character is escaping and the second game traces the input operation means based on designated operations and judges the adequacy of the conformity of the designated operation and trace operation.

By linking a second game with a first game as described above, it is possible to constantly feel a sense of tension even when there is some leeway during the escape.

DESCRIPTION OF THE PREFERRED EMBODIMENTS (Structure of Game Device)

Figure 1:
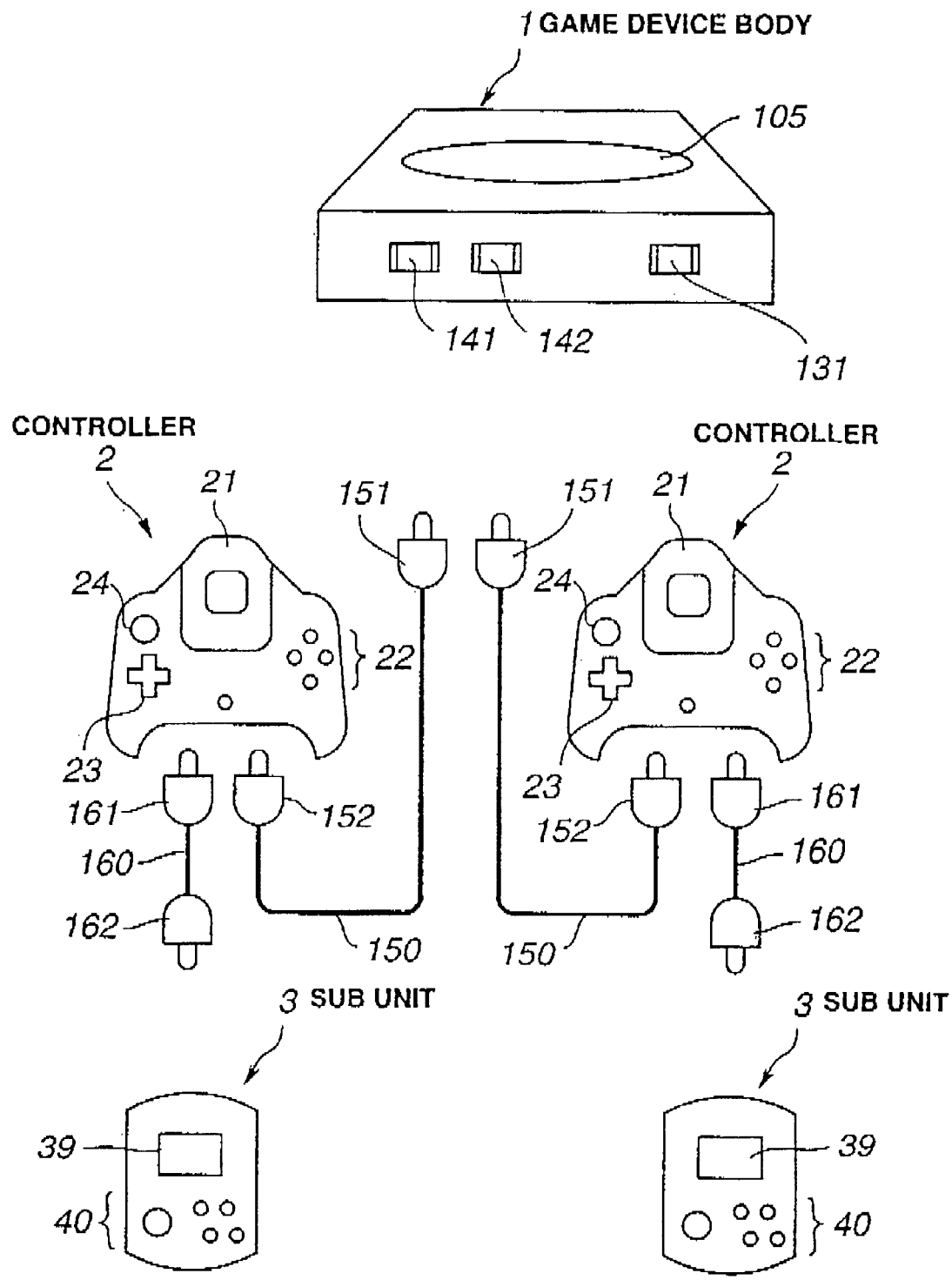
FIG. 1 is an outline view of the game device according to the present embodiment.

FIG. 1 shows an outline view of the game device according to the present embodiment. The game device is structured by mutually connecting a game device body 1, a controller 2 and a sub unit (subset) 3.

The game device body 1 is the control device main body for controlling the game progress. A plurality of controllers 2 may be connected to the game device body 1 and, therefore, the game device body 1 comprises connectors 141 and 142 and a communication circuit modular jack 131.

Moreover, the game device body 1 comprises a CD holder and is capable of freely installing and removing a recording medium such as a CD 200.

The controller 2 is of a structure as the operation unit to be operated by the respective players, and comprises a backup memory 21, operation button group 22, cross-shaped key 23, analog key 24, and so on. The controller 2 also comprises connectors for connecting the game device body 1 and the sub unit 3.

The sub unit 3 is a unit for displaying a sub image display and for the player to play a sub game, and comprises a sub monitor 39 and operation button group 40, and so on. The sub unit 3 also comprises a connector for connecting with the controller 2.

The connection cable 150 comprises connectors 151 and 152 and mutually connects the game device body 1 and the controller 2. The connection cable 160 comprises connectors 161 and 162 and mutually connects the controller 2 and the sub unit 3.

Figure 2:
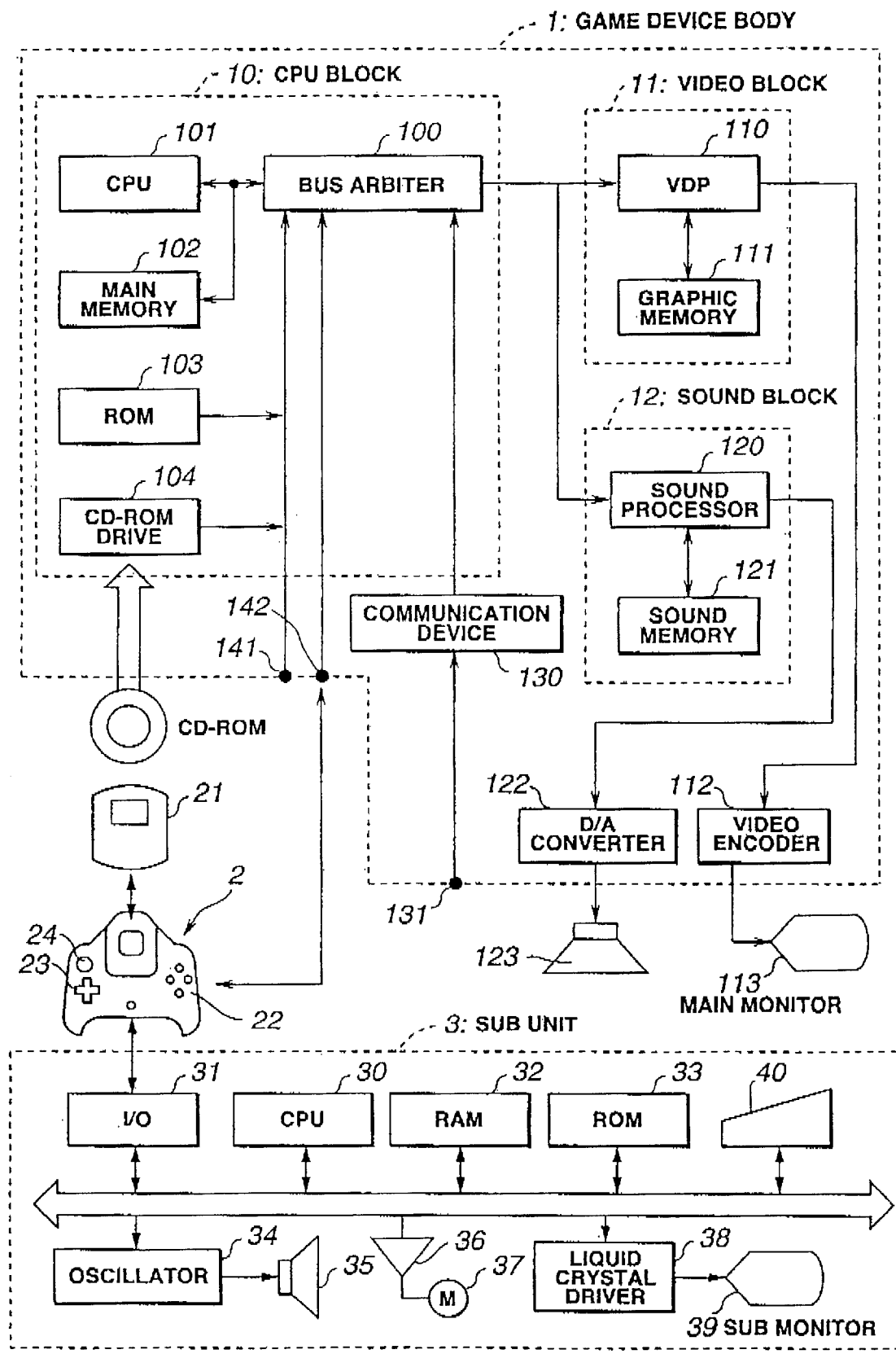
FIG. 2 is a control block diagram of the game device according to the present embodiment.

FIG. 2 shows a block diagram of the game device. The game device body 1, as shown in FIG. 2, comprises a CPU block 10, video block 11, sound block 12, and so on.

The CPU block 10 comprises a bus arbiter 100, CPU 101, main memory 102, boot ROM 103, and CD drive 1104. The bus arbiter 100 is structured to be capable of transmitting and receiving data by assigning a bus occupancy time to the devices mutually connected via the bus. The CPU 101 is structured to be capable of accessing the main memory 102, boot ROM 103, CD drive 104, video block 11 and sound block 12, and the backup memory 21 and sub unit 3 via the controller 2.

The CPU 101 executes the initialize program stored in the boot ROM 103 when the power is turned on, initializes the entire device, and, when it detects that the likes of a CD 200 has been installed in the CD drive 104, transfers the operating system program data stored in the CD 200 to the main memory 102.

Thereafter, the CPU 101 operates in accordance with the operation system, and continues to transfer and execute the program of the game processing method according to the present invention stored in the CD 200 to the main memory 102.

Further, the CPU 101 transfers game processing image data to the graphic memory 111, and sound data to the sound memory 121. The processing steps of the program executed by the CPU 101 are the likes of input of operation signals from the controller and communication data from the communication device, command output to the sub unit 3 based on such input and the control of image outputs to be conducted by the video block 11 and sound outputs to be conducted by the sound block 12.

The main memory 102 in principle stores the aforementioned operating system program data and other programs, and also provides a work area for static variables and dynamic variables. The boot ROM 103 is a storage area of the initial program loader.

The CD drive 104 is capable of receiving the CD 200, and, when the CD 200 is installed thereinto, the CPU 101 outputs data to such extent, and data may be transferred pursuant to the control of the CPU 101.

The CD 200 stores the program for making the game device execute the game processing, image data for image display, and sound data for sound output, and so on. The recording medium is not limited to the CD 200, and may be other various machine-readable recording mediums. It is also possible to transfer the data groups stored in the CD 200 via the communication device 130 to the respective memories. This type of setting enables data transmission from secure disks of remote servers and the like.

The video block 11 comprises a VDP (Video Display Processor) 110, graphic memory 111 and video encoder 112.

The graphic memory 111 stores image data read from the CD 200 as described above.

The VDP 110 reads image data necessary for image display among the image data stored in the graphic memory 111, and executes coordinate conversion (geometry operation), texture zapping processing, display priority processing, shading processing and so on in accordance with the information necessary for the image display supplied from the CPU 101; that is, command data, viewpoint position data, light source position data, object designation data, object position data, texture designation data, texture density data, visual field conversion matrix data, etc. Further, it is possible to structure the CPU 101 to conduct the processing of the aforementioned coordinate conversion and the like. In other words, the respective processing steps may be assigned to the respective devices in consideration of the operation capacity of the devices. The video encoder 112 is structured to be capable of converting the image data generated by the VDP 110 into prescribed television signals in an NTSC format and the like and outputting such signals to the main monitor 113 connected externally.

The sound block 12 comprises a sound block 120, sound memory 112, and D/A converter 122. The sound memory 121 stores sound data read from the CD 200 as described above.

The sound processor 12 reads sound data such as the waveform data stored in the sound memory 12 based on the command data supplied from the CPU 101 and conducts various effects processing and digital/analog conversion processing etc. pursuant to the DSP (Digital Signal Processor) function. And, the D/A converter 122 converts the sound data generated by the sound processor 120 into analog signals, and output such signals to the speaker 123 connected externally.

The communication device 130 is, for example, a modem or terminal adapter, is connectable to the game device body 1, and functions as an adapter for connecting the game device body 1 and external circuits.

Moreover, the communication device 130 receives the data transmitted from the game supply server connected to a public circuit network, and supplies this to the bus of the CPU block 10. As such public circuit network, employed may be a subscription circuit, private line, wired or wireless line, etc.

The controller 2 periodically converts the operational status of the operation button group 22 and cross-shaped key 23 into codes and transmits such codes to the game device body 1. The operation signals from the respective controllers 2 are used for moving the two characters, respectively, displayed on the game screen. Moreover, when a command from the sub unit 3 is transmitted from the game device body 1, the controller 2 transfers this command to the sub unit 3. In addition, the controller 2 transmits and receives parameters for specifying the game processing state and setting data of characters etc. to and from the game device body 1, and reads such data from and writes such data in the backup memory 21. The backup memory 21 can be freely connected to the controller 2, and freely accessed from the CPU 101. The backup memory 21 is also a storage area of setting data including the progress state and game scores arising during the game and settings such as operation methods and so on.

Such setting data functions as the backup data for restarting the game from the state immediately before turning the power off upon turning the power off, and may also be employed as the data for reflecting the operation state of other game devices as is to the current game device by exchanging the backup memory.

The sub unit 3 functions as a sub monitor for displaying a sub image corresponding to the command transmitted from the game device body 1 via the controller 2, and as a portable game device capable of independent operation.

Specifically, the sub unit 3 comprises a CPU 30 interface circuit 31, RAM 32, ROM 33, oscillation circuit 34, speaker 35, piezo-drive circuit 36, piezo element 37, liquid crystal driver 38, sub monitor 39 and operation button group 40.

The interface circuit 31 is capable of transmitting and receiving data to and from the controller 2.

The RAM 32 is the operational area of the CPU 30. The ROM 33 stores a program for making the sub unit 3 operate as a portable game device, as well as sub image data in the case of being operated as a sub monitor. This sub image data is image corresponding to the image generated in the game device body 1.

The oscillation circuit 34 generates sound signals in a prescribed frequency pursuant to the control of the CPU 30, and the speaker 35 is capable of converting such sound signals into sound. The oscillation circuit 34 and speaker 35 are sound generation mechanisms, and, for example, may be structured as a buzzer and the like upon generating sounds such as "beep, beep, beep" used in cellular phones to be recognized by the player as sounds of a prescribed frequency (1 kHz for instance).

The piezo-drive circuit 36 generates drive signals of a prescribed frequency pursuant to the control of the CPU 30, and the piezo element 37 converts inputs and electromechanically converts such signals into a vibration of a prescribed frequency. Such piezo-drive circuit 36 and piezo element 37 are vibration generation mechanisms, and, for example, may be structured as an eccentric motor and the like capable of making a player recognize a prescribed vibration upon being used in a similar manner as with the vibration in a cellular phone.

The liquid crystal driver 38 comprises a video memory, and is structured to be capable of renewing the drawing data of the video memory pursuant to the control of the CPU 30, and the sub monitor 39 is capable of displaying the drawing data stored in the video memory as images.

The liquid crystal driver 38 and sub monitor 39 will suffice so as long as they are structured to be capable of making the player recognize characters and images in a similar manner as with the LCD in a portable information terminal.

The CPU 30 displays the sub image according to the game processing in the game device body 1 based on the program stored in the ROM 33 on the sub monitor 39. Then, when a command is transmitted from the game device body 1 via the interface circuit 31, the CPU 30 reads the new sub image data corresponding to such command from the RON 33, and renews the sub image displayed on the sub monitor 39. Moreover, when the contents of the command are indicating sound generation, the CPU 30 operates the oscillation circuit 34 and generates sound, thereby stimulating the player's sense of hearing. Further, when the contents of the command are indicating vibration generation, the CPU drives the piezo-drive circuit 36 and transmits vibrations to the player holding the sub unit, thereby stimulating the player's tactile sense.

In the aforementioned structure, the sub unit was connected to the controller 2 via the connection cable 160 as shown in FIG. 1, but the sub unit 3 may also be integrally connected to the controller 2 by being housed in a prescribed location thereof.

(Schematic Structure of Game Contents)

Figure 3:
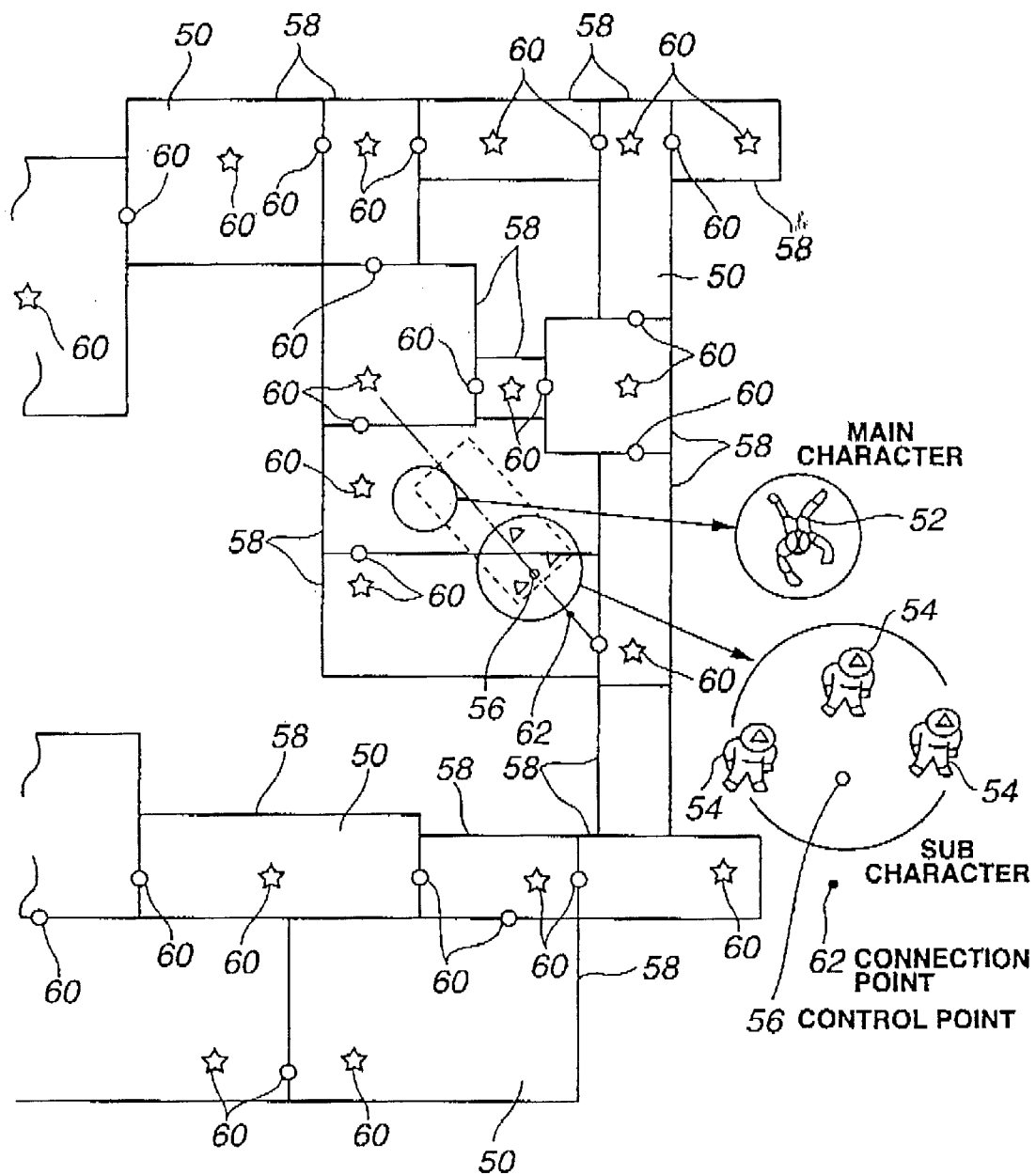
FIG. 3 is a plan view of the virtual space on the monitor screen showing a part of the area where the main character escapes and the sub character chases after it in the first game.

On the monitor screen connected to the game device body 1 is displayed a virtual space as shown in FIG. 3, and on the path 50 in this virtual space, a main character 52 escapes and a plurality of sub characters 54 chase such main character, which is the gist of the game.

The main character 52 may be moved in a desired direction by the player operating the aforementioned controller 2. Meanwhile, as the sub character 54 chases the main character 52 by automatically calculating the tracking direction based on the position of the main character 52, it is necessary for the main character to constantly run away.

When the distance between the main character 52 and the sub character 54 becomes less than a prescribed distance, the sub character executes a predetermined operation (jump on operation). By the sub character 54 jumping on the main character 52, the capture is completed and prescribed damage is sustained by the main character 52. The basic operational control functions are listed below:

1. Once it discovers the main character 52, the sub character 54 chases the main character and will not stop such chase thereafter.
2. When the sub character is still, the rear will be a blind spot.
3. The sub character is controlled to be in one mass, and larger the number of sub characters 54 in the mass, larger the damage.
4. Several formations are set for the sub character groups.
5. The sub character 54 detects the obstacles on the path and avoids such obstacles by moving two-dimensionally.
6. The weakness of the sub character 54 is that it can not climb to high place, it can not get down to low places, it can not climb walls; that is, it is limited to two-dimensional movements.
7. When the sub character approaches the main character within a prescribed distance, it executes the predetermined jump-on operation.
8. The sub character has a break period, and chasing during such break is alleviated.

(Characteristics of Game Contents)

In the present embodiment, sub characters 54 moving in groups will be grouped and registered in consideration of the fact that the sub characters 54 will move in groups.

Each of the grouped sub characters 54 respectively have their moving speed and capabilities for discovering the main character 52, but the movement direction is unified. In other words, a control point 56 is formed on the road in the virtual space and all the sub characters 54 in a single group will move based on this single control point 56.

Here, the formation will differ in accordance with the number of sub characters 54 in the group.

Moreover, the virtual space is divided into a plurality of blocks 58, and within these blocks 58 as well as at the boundary of the respective blocks 58, a pass point 60 is provided (there are boundaries without the pass point 60). If the main character 52 and sub characters 54 simultaneously exist inside such area divided by the pass point 60, the sub characters are programmed to execute the jump-on operation toward the main character 52.

The control point 56 moves along the line connecting the pass points 60 so as to trace the same. Further, although a straight line was used to connect the pass points 60 in the present embodiment, it may also be of a smooth curved line which interpolates the pass points 60. It may also be a dotted line.

It is also possible to provide a connection point 62 in addition to the control point 56 in the present embodiment.

This connection point 62 is for making the sub characters 54 grouped into two or more groups into one large group. While storing the initially grouped group units, the two or more groups are connected at the connection point 62 and executes the same operation.

The generation of this connection point 62 is when two or more groups approach each other in a prescribed distance, and, here, the connection point 62 is generated at the rear part of the leading group (c.f. FIG. 4 (A)). The control point 56 of the trailing group will be in a connected state by being overlapped with the connection point 62 of the leading group (c.f. FIG. 4 (B)). Moreover, although the connection point 62 was made to be generated, it may constantly exist. This connection point 62 may or may not be displayed.

Further, the release of this connection is made when one or more sub characters 54 belonging to one or more groups start attacking the main character 56. This release may also be made when all of the sub characters 54 belonging to one group starts attacking the main character 52.

(Outline of Second Game and Computing Method of Score)

In the present embodiment, in addition to the aforementioned game directed to chasing and escaping (first game), it is possible to execute a second game during the first game.

The second game is a graffiti writing game. When the main character 52 is escaping from the sub characters 54, there are times when the main character has some leeway. Here, as shown in FIG. 5(B), a graffiti board 80 is displayed on the wall in the virtual space, and a few input request screens 82 among the four types of oval, circular, clockwise and counterclockwise are two-dimensionally displayed so as to overlap with the virtual space.

Figure 5A:
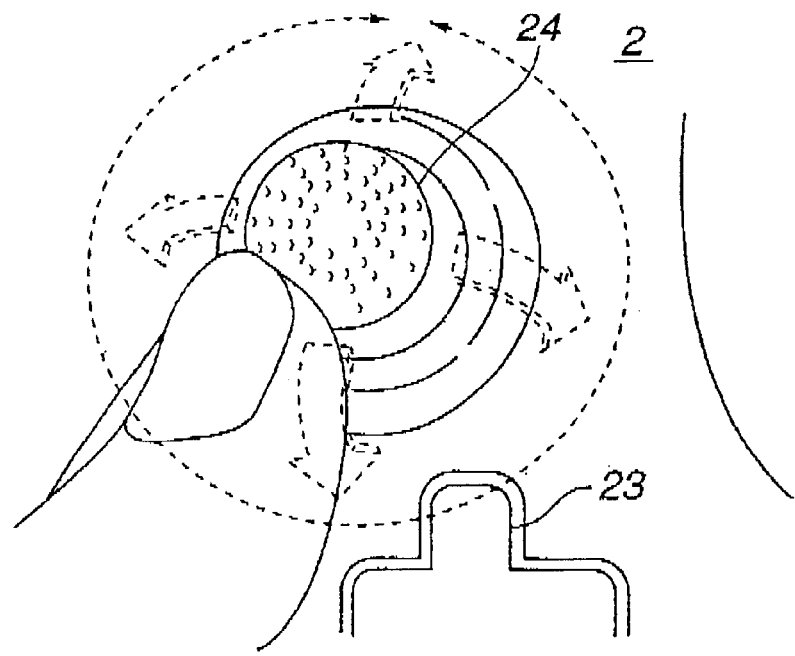
FIG. 5(A) is an enlarged view showing the operational state of the analog key during the execution of the second game and FIG. 5(B) is a front view of the virtual space screen in the state of the second game.
Figure 5B:
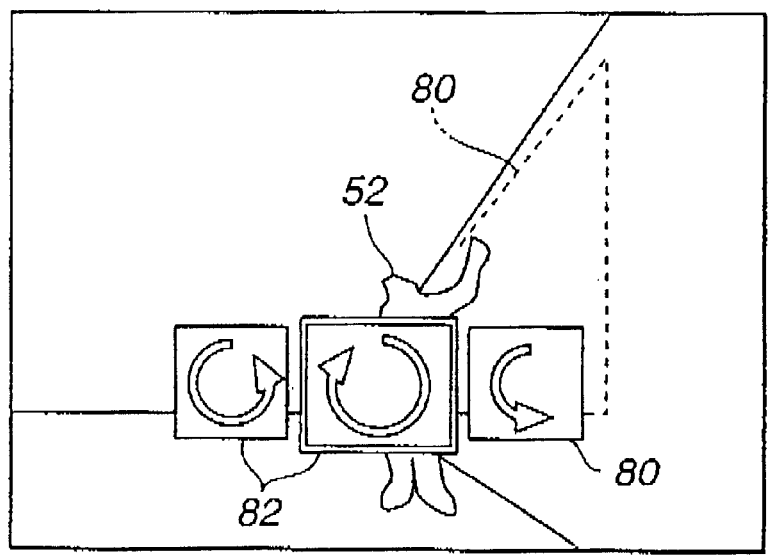

As shown in FIG. 5(A), the player operates the analog key 24 of the controller 2 and traces the designated operation. For example, when "circular, clockwise" is designated, the player operates the analog key 24 of the controller accordingly. As the analog key 24 is provided with a potentiometer (not shown), it is possible to electrically recognize the state of the trace operation. Here, the conformity of the designated operation and the trace operation is judged, and the result of OK/NG is output.

This second game is divided into seven stages. In the first stage, there are a plurality of actions (graffiti execution) and the first stage can be cleared by succeeding in all of the actions. Scores for clearing the respective stages are displayed on the wall in the virtual space. The player is allowed to select whether he/she wishes to proceed to the next stage or quit the game upon completing (succeeding in) the respective stages. Moreover, upon failing in the respective stages, the points acquired up until then are cancelled. In other words, the points scored in the respective stages are not immediately added, and are collectively added at the end of the game. In addition, for instance, it is also possible to set the likes of an easy node so that the points scored are provided regardless of the failure during a certain stage.

Although the second game is not that difficult a game, as it is a situation where the main character 52 is being chased by the sub characters 54, the player will play the second game with a sense of tension. In other words, the player may experience the feeling of thrill wherein he/she wishes to proceed to the next stage, but, by going forward to score more points, the player may lose all points obtained up to such time if the sub characters 54 catch up with the main character 52 during the second game.

The operation of the present embodiment is now explained.

The characteristic operation pertaining to the escaping and chasing of the present game is described with reference to FIG. 5 and FIG. 6.

Figure 6:
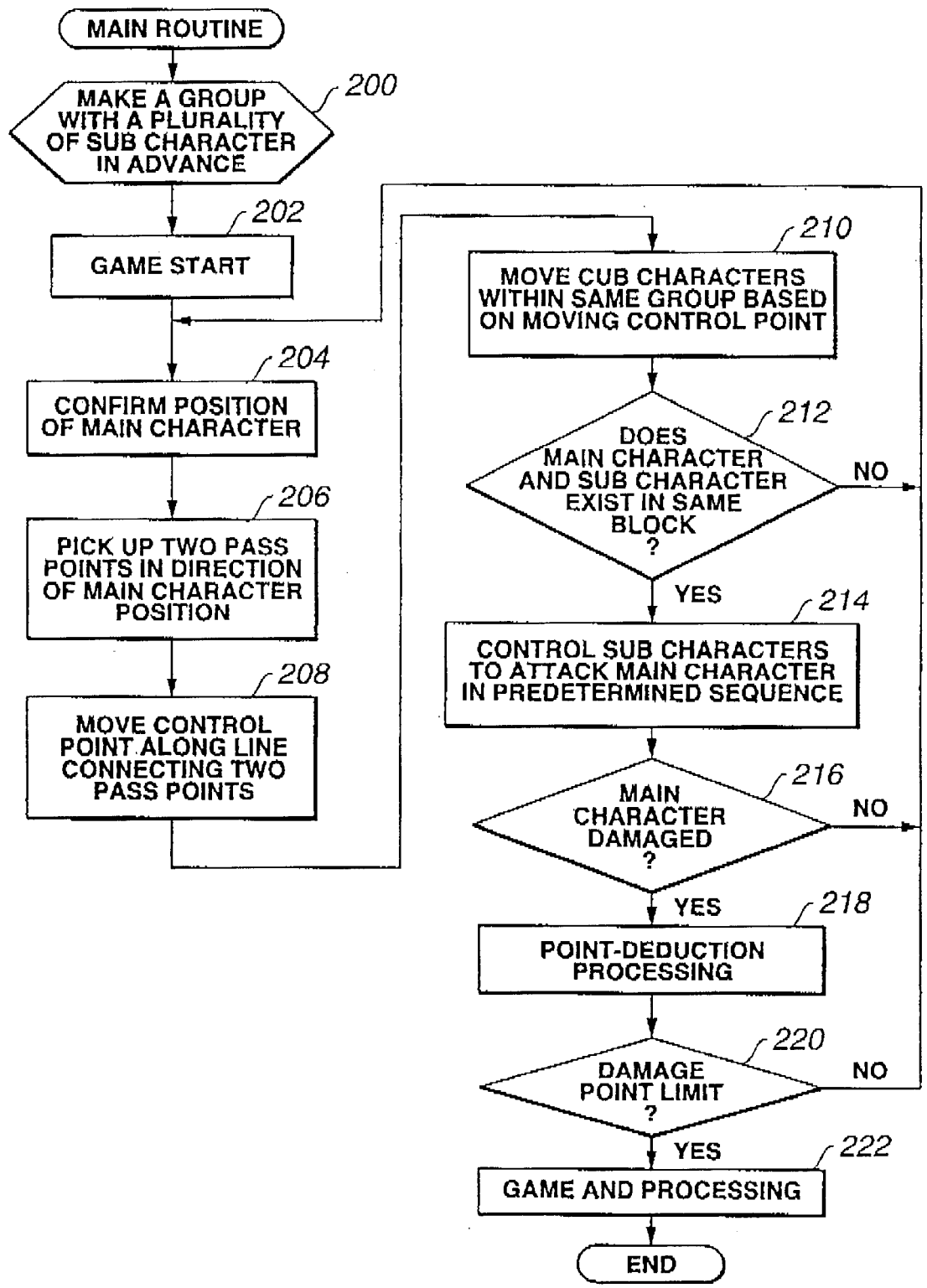
FIG. 6 is a control flowchart showing the operation of the first game.

FIG. 6 is the main routine of escaping and chasing, and, at step 200, a plurality of sub characters 54 are grouped in advance. Here, the number of sub characters 54 to be grouped are not limited, and may be grouped in twos, threes, fours, and so on.

In the next step 202, the game is started, and in the next step 204, the position of the main character is confirmed.

In step 206, two pass points 60 are picked up in the area along the direction of the confirmed position of the main character 52. Then, in step 208, the control point 56 is moved along the straight line connecting the two pass points. Here, if the grouped groups are positioned separately, control points 56 exist respectively, and, if the groups are in close vicinity, there are cases where the control points become common (connected state with the connection point 62).

In the next step 210, the respective groups begin moving based on the corresponding control point 56. During the movement based on this control point 56, it is judged whether the main character 52 exists within the same block 58 in which the group exists (step 212) Here, when the judgment is negative, it is judged that the main character 52 does not exist in the same block 58, and the process returns to step 204.

When the judgment is positive, it is judged that the main character 52 exists in the same block 58, and the process proceeds to step 214 and makes the sub characters 54 jump on the main character 52 in predetermined order.

Contrarily, the main character may succeed or fail to avoid such attack pursuant to the player's operation. Thus, as the damage will vary, at step 216, foremost, it is judged whether the main character 52 has been damaged, and when the judgment is negative, it is judged that the attack has been successively avoided and the process returns to step 204. Moreover, when the judgment is positive in step 216, it is judged that some degree of damage was sustained, and the process proceeds to step 218 for deduction of points and then proceeds to step 220.

In step 220, it is judged whether the damage points have reached the maximum value. If this judgment is negative, the process returns to step 204 so as to continue the game, and when the judgment is positive, the process proceeds to step 222 and conducts the game-ending processing.

Figure 7:
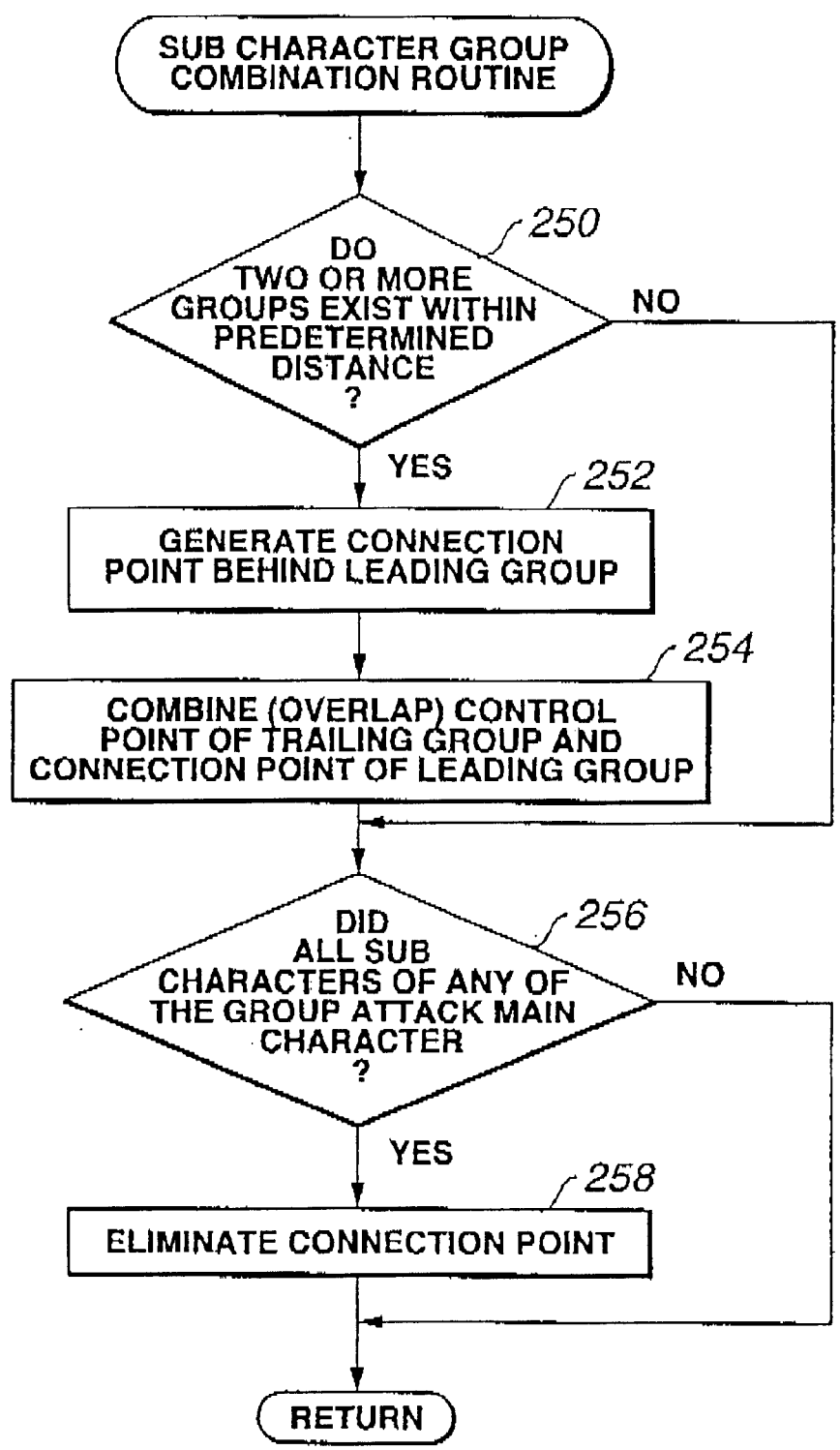
FIG. 7 is a control flowchart showing the group combination operation.

In the aforementioned game process, there are cases when the grouped sub characters 54 approach each other. In such a case, the groups are made to form an even larger group which chases the main character 52. FIG. 7 shows the combination control routine of such groups.

Figure 4A:
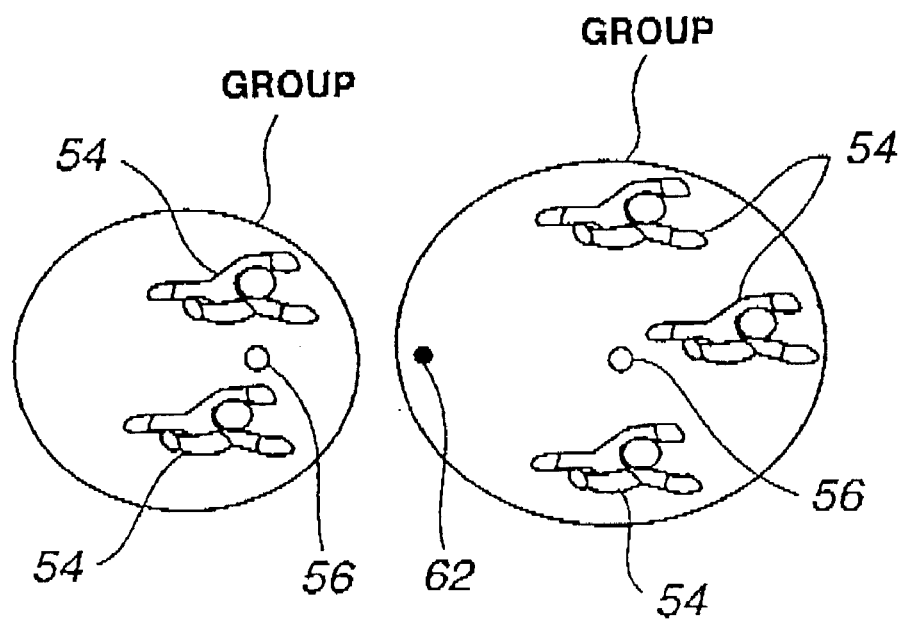
FIG. 4 is a virtual space on the monitor screen and (A) is a diagram showing the state when the two sub character groups approach each other and (B) is a plan view showing the combination of the control point and connection point.

Foremost, in step 250, it is judged whether the two or more groups have approached each other within a prescribed distance, and when the judgment is positive, the relative position between two groups in such two or more groups is determined, and, as shown in FIG. 4(A), a connection point 62 is generated at the rear portion of the leading group (step 252) For example, when there are three groups, a connection point 62 is generated between the two groups of the leading group and the middle group, and a separate connection point 62 is generated between the two groups of the middle group and the trailing group. When the judgment is negative at step 250, the process proceeds to step 256 explained later. Here, the generation of a connection point 62 will suffice so as long as such connection point 62 is generated when necessary, and the connection point 62 may exist from the beginning; that is, at the time of forming the groups.

Figure 4B:
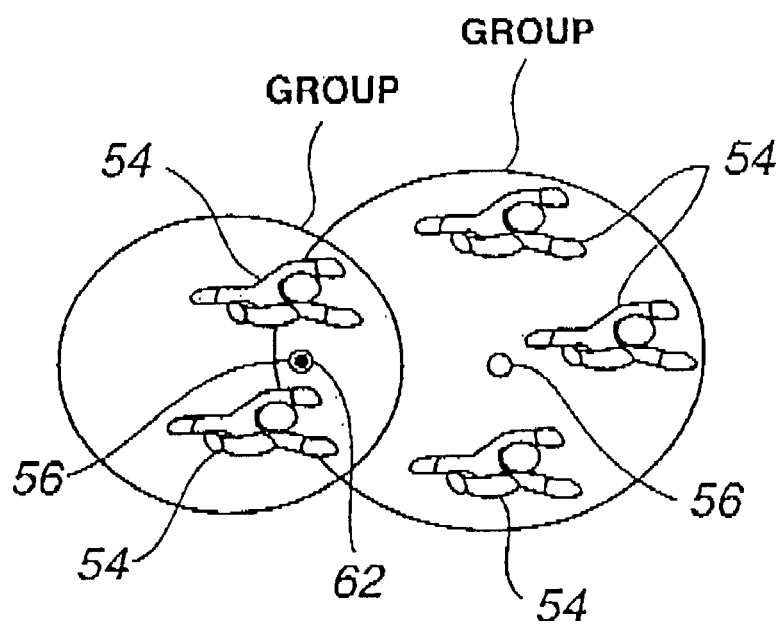

As shown in FIG. 4(B), the control point 56 of the trailing group overlaps with and connects to the connection point 62 (step 254), and this connected group will thereafter move in unity. In other words, the leading group moves toward the control point 56 and the trailing group moves toward either the control point 56 or the connection point 62 of the leading group. Moreover, it is possible to connect control points of two or more groups to the connection point 62 of one leading group.

In the next step 256, it is judged whether all the sub characters 54 of any group has jumped on the main character 52, and when the judgment is negative, this routine is ended so as to maintain the connection. When the judgment is positive, the process proceeds to step 258 and eliminates the connection point 62. Thereby, the movements thereafter will be separate. It is also possible to release the connection at the time when one sub character 54 jumps on the main character 52.

As described above, in the present embodiment, by grouping the sub characters 54 and causing all of such grouped sub characters 54 to move based on the same control point, the processing load is lightened in comparison to individually chasing the main character 52, it is possible to display more sub characters 54, and prevents defects such as slow game progress and partially deficient screen display. In addition, as it is possible to produce a sense of tension to the main character 52 (player) of being chased by a group, the game amusement is enhanced thereby.

Moreover, in the present embodiment, as it is possible to generate a connection point 62 when two or more groups approach each other and connect such two or more groups, the tension of cornering the main character 52 can be increased.

Next, the scoring procedure by the graffiti during the escape is described.

Figure 8:
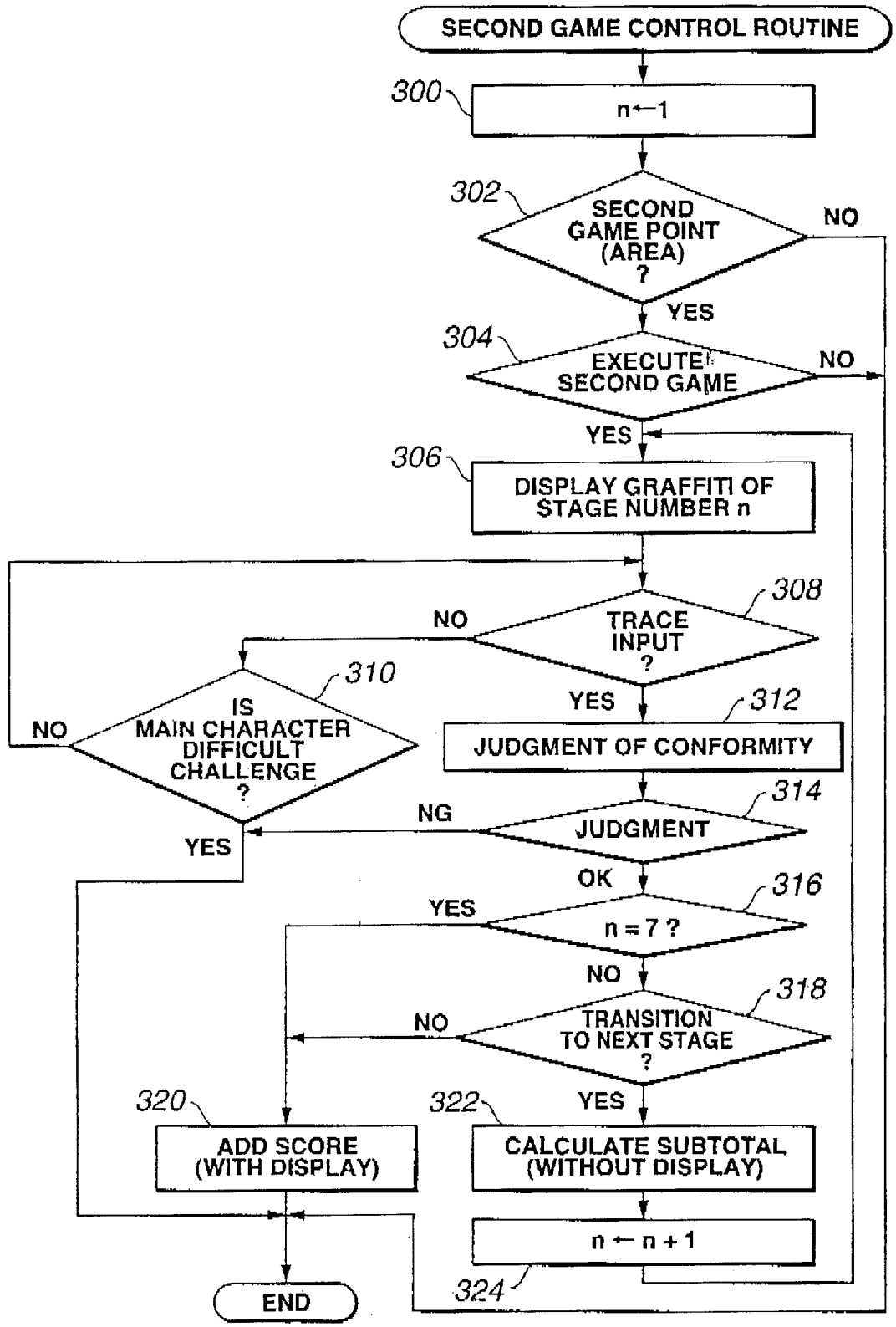
FIG. 8 is a flowchart showing the game progress and the score adding control.

The operation of the second game and the score computing procedure are now described with reference to the flowchart shown in FIG. 8.

In step 300, variable (stage number) n is set to 1, the process proceeds to step 302 to judge whether the main character 52 is in the game point of the second game, and, when the judgment is positive, the process proceeds to step 304 and judges whether to execute the second game. If the player operates the controller so as to imply his/her intention to play the second game, the process proceeds to step 306, the graffiti image of stage number n is displayed (the first stage will be displayed first as a matter of course), and the process proceeds to step 308.

In step 308, it is judged whether a trace input has been made or not, and when the judgment is negative, it is judged in step 310 as to whether the main character 52 has moved away from the second game area. Here, the player is capable of trace operations with the analog key 24 of the controller 2, but there are cases where the sub character 54 approaches the main character 52, and such main character has no choice but to escape and move away from the second game area. Thus, depending on whether the training operation comes first or the action of moving away comes first, the following operation will differ.

In step 308, when the trace operation comes first, the process proceeds to step 312. When it is confirmed that the main character moved away from the area in step 310, it is judged that the player abandoned the game, and the processing ends. In such a case, no points are added.

Conformity is judged in step 312, and upon proceeding to step 314 and when the judgment in step 312 is OK, the process proceeds to step 316. Moreover, the processing ends when the judgment result is NG in step 314.

In step 316, it is judged whether the variable n is 7. Here, when the judgment is negative, it is judged that there are stages remaining and the process proceeds to step 318, and judges whether to proceed to the next stage.

Here, if the judgment is positive in step 316; that is, when all stages have been cleared, or when the player ends the game pursuant to his/her intention in the negative judgment of step 318, the process proceeds to step 320 and ends the processing upon adding the points scored up until then (with display). When the judgment is positive in step 318, the process proceeds to step 322.

In step 322, the subtotal of the current points is calculated (without display), and, after incrementing the variable n at step 324, returns to step 306.

In addition, the subtotal may be displayed on the screen. Or, the likes of an easy mode may be set so that the obtained points are not cancelled even upon failing in a certain stage. By this, beginners will be able to score points and continue the game.

As described above, by playing a second game during the progress of a second game, it is possible to obtain points when there is leeway during the escape, and the player may therefore constantly concentrate on the game. Further, in the second game, when ending the game without clearing the respective stages, the calculation method is set so as to cancel all points scored by clearing the stages up to such time. Thus, upon proceeding to the next stage in order to score more points but the condition requires the player to escape as the sub character 54 is approaching, it is possible for the player to play the game under tension, and obtained is game amusement exceeding the mere combination of two games.

Accordingly, as described above, the image processing device and game device including group character movement control according to the present invention are capable of carrying out the processing steps without increasing the processing load and without giving any sense of strangeness, such as dull movement, even when the number of characters to be moved and controlled in the virtual space increases.

Moreover, the present computing method of game scores is capable of constructively deviating from the one game story and scoring in a different form.

What is claimed is:

1. An image processing device for controlling the display image such that a main character which moves pursuant to input operations, and a plurality of sub characters in which a movement direction thereof is determined based on a movement of said main character, are displayed in a virtual space, and the plurality of sub characters chase after said main character, said image processing device comprising:

grouping means for automatically grouping said plurality of sub characters in a number of sub-character groups;

control point generation means for providing within said virtual space a control point for each of said sub character groups, for moving the plurality of sub characters within each group in the same direction;

confirming means for confirming a position of the main character;

setting means for setting an optimum route for each sub character group to approach the main character based on the position of said main character and the control point, wherein each sub character group picks up two pass points in a direction of the position of said main character and said setting means moves the control point for each sub character group along a line connecting said two pass points;

movement control means for automatically moving said sub character groups by tracing the control point based on the optimum route set with said setting means; and connection means for automatically connecting two or more of said sub character groups at a connection point when said two or more or said sub character groups are within a predetermined distance of each other, one of said groups being a leading group and another of said groups being a trailing group, said two or more of said sub character groups moving independent of each prior to automatic connection by said connection means;

wherein a distance associated with the optimum route may exceed an actual distance to the position of said main character from the control point.

2. An image processing device according to claim 1, wherein the trailing group chases the leading group and connects thereto, and, after the connection, chases a main character based on the control point of the leading group.

3. A game device including group character movement control, comprising:

display control means for displaying a main character and a plurality of sub characters, in a prescribed area displayed in a virtual space;

input operation means for making said main character freely movable based on an operation of the game device by a player; and passage route setting means for setting a predetermined passage route at a prescribed position in said virtual space;

wherein said game device confirms a position of the main character, successively sets an optimum passage route for approaching the main character based on the position of said main character and a control point associated with the plurality of sub characters, picks up two pass points in a direction of the position of said main character, moves the control point along a line connecting said two pass points, and controls the movement of said sub characters for chasing and capturing a main character; and wherein said plurality of sub characters are automatically grouped in a number of sub character groups at prescribed intervals and said sub character groups are automatically moved based on said control point by setting a second control point for each sub character group, and said passage route setting means sets a passage route for each second control point; and wherein a distance associated with the optimum passage route may exceed an actual distance to the position of said main character from each second control point.

4. A game device including group character movement control according to claim 3, wherein when two or more groups enter an area in a prescribed range, said game device controls the processing such that the trailing group chases the leading group and contacts thereto, and, after the connection, the trailing group moves based on the control point of the leading group.

5. A game device including group character movement control according to claim 3 or 4, wherein when said sub characters approach said main character within a prescribed distance, said sub characters are capable of attacking said main character.

6. A game device including group character movement control according to claim 5, wherein said attack is controlled such that the sub characters jump on and capture the main character, and said main character is capable of being operated to escape such capture from the start to the end of the capture operation of said sub characters.

7. A game device including group character movement control according to claim 6, wherein said attackable area is separated into blocks, and, for each block as well as for adjacent, block boundaries, a pass point is provided to become the base for setting the movement target of said sub characters.

8. A game device including group character movement control according to claim 7, wherein said control point moves along the line connecting said pass points.

9. A game device including group character movement control according to claim 8, wherein with respect to the plurality of groups connected at said connection points, the connection at the connection point may be unconnected when the sub characters start attacking said main character.

10. A group character movement control method to be employed in a game device comprising:

display control means for displaying a main character and a plurality of sub characters in a prescribed area displayed in a virtual space;

input operation means for making said main character freely movable based on an operation of the game device by a player; and passage route setting means for priorly setting a passage route at a prescribed position in said virtual space;

wherein said game device picks up two pass points in a direction of the position of said main character, and moves a control point along a line connecting said two pass points;

wherein said game device successively sets an optimum passage route and controls the movement of said sub characters for chasing and capturing a main character; and wherein said group character movement control method comprises the steps of:

grouping said plurality of sub characters in prescribed numbers;

setting a second control point for each separated group; and moving, irrespective of the player's operation of the game device, the plurality of sub characters in said groups based on each second control point; and wherein a distance associated with the optimum passage route may exceed an actual distance to the position of said main character from each second control point.

11. A group character movement control method according to claim 10, wherein when two or more groups enter an area in a prescribed range, said game device controls the processing such that the trailing group chases the leading group and connects thereto, and, after the connection, the trailing group moves based on the control point of the leading group.

12. A recording medium storing the group character movement control method according to claim 10 or claim 11.

* * * * *